Sept. 26, 1961 L. FRANCESCHINI 3,001,846

SEALED MAGNETIC RECORDING DEVICE

Filed Feb. 5, 1958 2 Sheets-Sheet 1

INVENTOR:
LORENZO FRANCESCHINI
By
Richardson, David and Nordon
ATTYS.

Sept. 26, 1961 L. FRANCESCHINI 3,001,846

SEALED MAGNETIC RECORDING DEVICE

Filed Feb. 5, 1958 2 Sheets-Sheet 2

INVENTOR:
LORENZO FRANCESCHINI
By
Richardson, Davis and Nordon
ATTY'S.

United States Patent Office 3,001,846

Patented Sept. 26, 1961

3,001,846

SEALED MAGNETIC RECORDING DEVICE

Lorenzo Franceschini, Florence, Italy, assignor to Officine Galileo Societa per Azioni, Florence, Italy, a corporation of Italy Filed Feb. 5, 1958, Ser. No. 713,430
Claims priority, application Italy Feb. 11, 1957
5 Claims. (Cl. 346—14)

The present invention relates to devices for the collection of consumption data in electric power, gas, water integrating meters or the like by means of recordings. Such recordings may be effected in the meter by prints, punchings, relief impressions or by any other suitable means, and such recordings are formed on cards or papers which are prepared in advance with appropriate outlines. The markings of the consumption data are made directly on the card within the outlines with which the card is provided in advance. The cards marked in accordance with the invention may be used either directly, for example in mechanized accounting system, or indirectly for the formation of other cards.

Among the systems which have the best high speed performance in collecting and handling data, there are those systems which use cards in which the data are stored magnetically, similarly to what occurs in the magnetic recording tapes, or in the devices for the storing of information signals (magnetic memory) in electronic computer machinery and the like. A high speed recording system for the recording or collection of consumption data disclosed by a measuring instrument or meter thus may be an advantageous feature either for its practicality or for the speed through which the recorded cards may be read in an accounting or billing office.

The object of the present invention is to provide a system and a device for the collection of consumption data in electric power, gas, water meters or the like, said device using a card for recording purposes wherein marks expressing consumption data by their positions or by their form, are formed by magnetized dots, lines or zones, having an appropriate area and shape.

The present invention concerns, therefore, a data recording device for operation with a meter for the particular requirements of making impressions on cards, which impressions are indicative of the reading of the meter. To obtain the impressions on the cards, the device of the invention operates to activate the "counting train" to transform the rotary motion of the rotary elements of the meter that totalize the revolutions or the oscillations of the drive member of the meter to make a permanent marking on a card.

The diagrammatic embodiments hereinafter described only as an example and illustrated in the accompanying drawings are designed to better clarify the abovementioned concepts.

FIG. 1 diagrammatically illustrates a side view of an embodiment of the invention showing its essential elements;

Figures 1, 2:
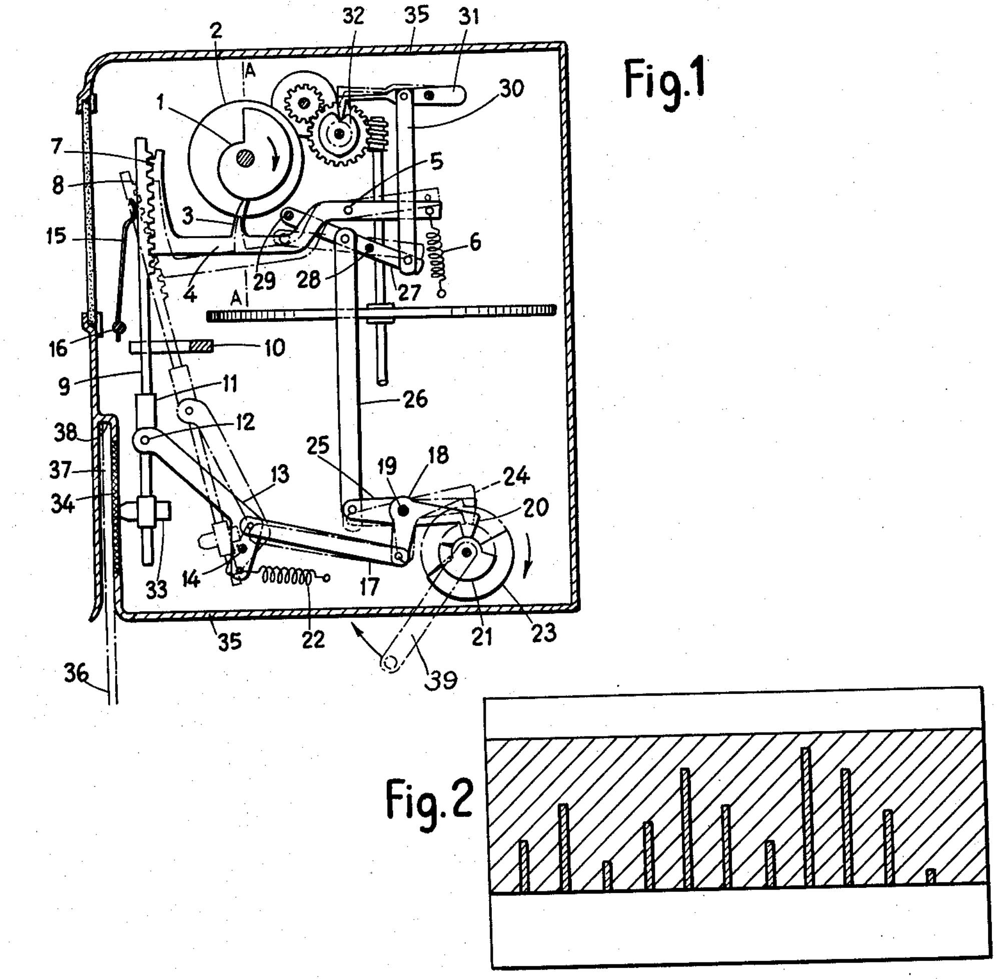
FIGS. 2 and 3 illustrate front diagrams of the magnetic recordings produced according to the embodiment of FIG. 1.

The device which operates the so-called "counting train" for recording purposes, includes a plurality of cams 1 associated with each of the rotary elements 2. The device of the invention is adaptable to totalize the revolutions or oscillations of the drive member of the measuring instrument (the meter provided for in the example is of the decimal type electric power meter). The surface of each cam 1 is formed to correspond to the several angular positions assumed by the cam, in the tracing plane AA (which forms the uniform reference of all the rotary members of the meter). Each of a plurality of feeler elements includes a contact member 3 carried by an arm 4. Each arm 4, in turn, is pivotable about an axis 5 and is kept in contact with the surface of the cam 1 by a spring 6.

The other end of each arm 4, furthermost from the spring 6, is provided with a gear sector 7 meshing a rack 8 carried by a corresponding rod 9. This rod 9 is guided laterally in one of the recesses of a fixed guide member 10, and still—more downwardly—by a sleeve 11 which is linked by pivot pins 12 to a lever 13 pivoted at point 14. Each rack 8 is kept in mesh with its associated gear sector 7 by a small leaf spring 15 mounted on a stationary support 16. One arm of the lever 13 is connected by a link member 17 to an arm of the bell crank lever 18 which is pivoted at 19, the other end 20 of each lever 18 being arranged as a cam follower to follow the profile of a cam 21 and the contact of the end 20 on the cam 21 is ensured by the tension of spring 22 which is hooked to the other arm of the lever 13.

A second cam 23 is arranged parallel to the cam 21 and on the same shaft. The profile of the cam 23 is followed by a projection 24 carried by a lever 25 which, in the preferred embodiment, is pivoted on the same axis as the bell crank 18. The projection 24 is shown in the recording position of the lever 25 and is concealed thus by the tooth 20. The opposite end of the lever 25 remote from the projection 24 is connected by a connecting rod 26 to a second lever 27. The lever 27 is pivotable about a point 28 which, in cooperation with another similar lever (not shown in the figure because it is superimposed) supports a transverse bar 29 which lies above all the levers 4 of the feeler elements and is arranged parallel to their common pivot axis 5. Another connecting rod 30, hinged on the same lever 27, is positioned to drive, by means of a lever 31, the heart-shaped cam 32 for the correctly aligned resetting to zero of the rotary members 2 of the "counting train." Other resetting means may be used.

A magnet 33, having a high coercive force is positioned at the lower end of each rod 9. The magnet 33 may be formed of an alloy commercially known under the name of Alnico or any other suitable magnet may be used. One end of the magnet 33 is pointed and the point abuts against a wall 34 of the casing 35 of the integrating measuring instrument. Adjacent each of the plurality of magnet heads and with a certain margin beyond the whole zone of influence of the magnets, both laterally and in the direction said magnets may move, the wall 34 is formed of a non-magnetic material having such thickness that the effect of the magnets 33 may reach beyond the wall 34 without undue attenuation.

During the usual operation of the meter, the arm 4 of each feeler element is lowered by the action of the bar 29 which is moved by the profile of the cam 23. Thus, each of the lugs or contact members 3 are retracted from the profile surfaces of the associated cams 1. In this way, all the rotary members of the counting device are free from any external influences. According to this arrangement and due to the action of the cam 21, through the members 18, 17, 13, and 11, the rod 9 is moved rearwardly, rotating the racks 8 on the associated gear sectors 7. The spring 15 ensures that the coupling continues between each gear and rack member. In this retracted position of the rod 9, each of the magnets 33 is in a retracted position also and, therefore, displaced with the head out of contact with the wall 34, the displacement being sufficient, in accordance to the invention, to reduce the magnetic effect of the magnet through the wall 34.

A magnetizable card 36, formed by any suitable material to receive a magnetic impression or mark by the magnets 33, is positioned on the outside of the wall 34 but in close proximity thereto. Of course, the material, which forms the whole card or a portion thereof, may be of any composition or make already known in the art.

The card 36 is introduced into an appropriate envelope 37 provided on the outside of the casing 35 to protect both the card and the non-magnetic wall 34. The card, preferably, is brought into contact with a reference plate 38 positioned at the bottom of each envelope 37, so that the plate forms a positional base reference for the recording. According to the invention, the assembly of the cams 21—23 is rotated in the direction of the arrow, for instance, by means of a crank 39 or by a key applied on the outside of the casing through an appropriate hole (not shown).

The invention has been described above in connection with FIG. 1 of the drawing which illustrates the preferred embodiment of the invention in its "operative position." In FIGURE 1, the cams 21 and 23 are oriented for operation of the recording device, i.e., permitting the feelers 3—4 to contact the cam 1 and permitting the magnets 33 to contact the wall 34. The normal condition for inserting or removing a card 36, however, involves the withdrawal of the feelers 3—4 from the cams 1 and the withdrawal of the magnets 33 from the wall 34 by rotating the lever 39.

With the magnets 33 retracted, the operator, firstly, introduces a card 36 into the envelope 37, for the recording, assuring that the card touches the entire width of the plate 38. In this operation, there will not be any magnetic impressions in the card because the magnets 33 are too distant to be able to sensitively effect it. In the subsequent stage, the key or crank 39 is rotated in the direction indicated by the arrow. At a certain point, the profile of the cam 21, which rolls under the tooth 20, rapidly decreases, and the square lever 18 rotates against the spring 22, rotating by means of the connecting rod 17 the lever 13. By this rotation, the rod 9 brings the magnets 33 into the operational position against the wall 34. The profile of the cam 23 also decreases in this point. Therefore, when the contacting tooth 24 is lowered, the lever 25 rotates and imparts a rotation through lever 26 to the lever 27. The bar 29 is raised and leaves the lever 4 in such a way that, under the action of the springs 6, the extensions 3 contact the profiles of the respective cams 1. However, still before these contacts occur and always pursuant the displacements of levers 25 and 27, the alignment of the meter's rotary members is effected with the members 30 and 31 by means of the heart-shaped device 32. Due to the corresponding rotations of the geared sectors 7 through the rods 9, the magnets 33 will mark each measurement with some displacements which will make impressions or marks on the card 36, or the sensitive portion associated to the card 36 in the case illustrated in the embodiment, starting from the bottom. FIG. 2 diagrammatically illustrates a facsimile of these empressions. After the recordings are completed, the profile of the cam 21 increases and, therefore, the levers 18 and 13 begin to rotate. The magnets are therefore withdrawn from the wall 34. In causing the rotation of crank 39, the profile of cam 23 is varied also, and therefore determines a rotation of the lever 25 and consequently, also of the lever 27 in a direction opposite to the previous one. The contacts 4 are withdrawn from the profiles of the cams 1 and the heart-shaped alignment device 32 is abandoned. Therefore, all the members return to the retracted positions, and the meter takes up its usual operation. The card, now may be extracted.

Figure 3:
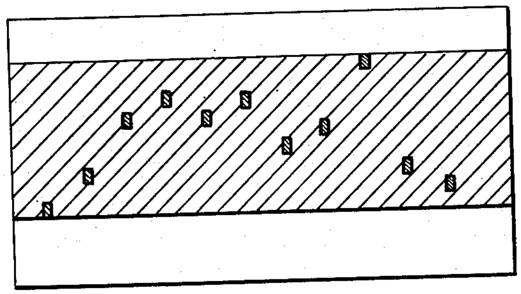

In addition to the consumption data recording system of the type indicated in the embodiment, the same device may also produce dots or small impression zones, as diagrammatically shown in FIG. 3. It is only necessary to vary the profile of the cams 21 to remain for nearly the entire cycle at the maximum extended position, except a depression, by means of which the magnets (which, although being in a retracted position, have received the displacements given by the cams 1, while the contact of the feelers still continues) are contacted with the wall 34 immediately after being rapidly withdrawn into the dwell position.

Another embodiment may be suggested, always in the spirit of the invention, and said embodiment permits recording in the same way as in the previously described embodiment, but without the use of the permanent magnets.

Figure 4:
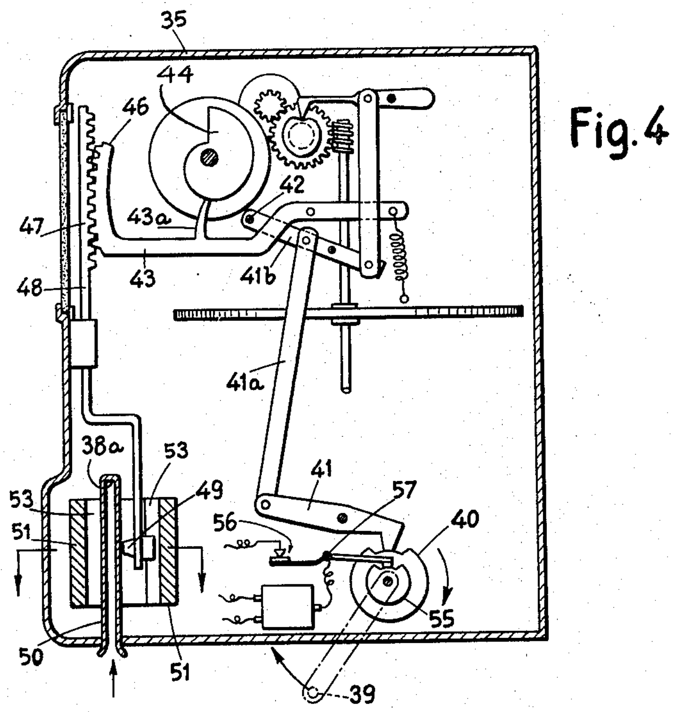
FIG. 4 illustrates a variation of the embodiment shown in FIG. 1.
Figure 7:
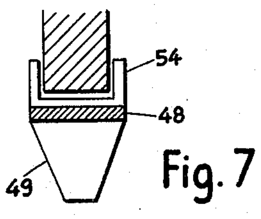
FIG. 7 illustrates a detail of the electromagnet.
Figure 5:
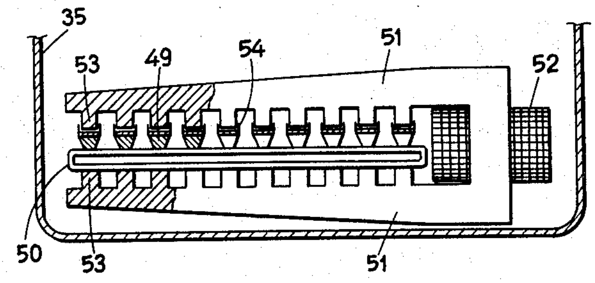
FIG. 5 and 6 illustrate two arrangements of the electromagnets according to the variation of FIG. 4.

With reference to the embodiment shown in FIG. 1, the assembly of the kinematic units and the operation of the feelers device is unvaried. In fact (see FIG. 4) the cam 40 driven by the key or crank 39 withdraws the bar 42 from the lever 43 through the movement of the links 41, 41*a*, and 41*b*. By this action, the extensions 43*a* are moved relative to the profiles of the cams 44 which are integral with the rotary members of the meter 45. The racks 47, connected to the rods 48, are meshed by the geared sectors 46 of the levers 43. A soft iron conical or pyramid body 49 is integral at the lower end of each of the rods 48, with the tip directed towards a wall of the envelope 50 in which the magnetizable card is to be introduced. The soft iron body 49 and the envelope 50 are included between the shoes 51 of an electromagnet energized by a coil 52. The inner portion of the shoes is provided with transversal grooves, and arrangement of the grooves is provided in such a way that a relief 53 corresponds to each body 49 in the two shoes 51. The relief is arranged, moreover, to serve as a guide for the same body, which, for this purpose is provided with a C-shaped extension 54 located on the cross-section of the abutment.

Similarly to the embodiment of FIG. 1, this device may effect line recordings (as in the scheme of FIG. 2 or with dots or zones as shown in FIG. 3). In this case also, these two possibilities are a function of the shape and adjustment of the cam 55 integral with the cam 40, upon which in fact the opening and closing of a switching device 56 rely. The switch 56 combined with the lever 57 is inserted in the supply circuit of the energizing coil 52.

If a "length" recording is required (see FIG. 2), once the card is introduced into the envelope 50 in such a way that it may touch the bottom along the entire width, the set of the cams 40, 55 is operated by the crank 39. Departing also in this case from a normal position whereby the meter device is free from the feelers, the bodies 49 are aligned downwardly. Therefore, firstly the cam 55 lowers the contact 56 energizing in this manner the electromagnet 51—52. As a result of this energization, the levers 42 are freed and rotate to raise the bodies 49 through the levers 46, 47, 48 until the extensions 43*a* contact the profiles of the cams 44. At this point, when effecting the recording, the contact 56 opens the circuit and the energization ceases. Continuing rotation of the cams, the bar 42 is lowered, lowering in the meanwhile the bodies 49, and everything returns to the rest position.

When, on the contrary, a dots or zones recording is required, the cam 55 closes the contact 56 for a short length of time only when the contacts of the feelers 43*a* occur with the cams 44 and only when the magnet is not energized. The came 40 returns the bodies 49 into the normal position and that is at the downward end of the stroke.

Figure 6:
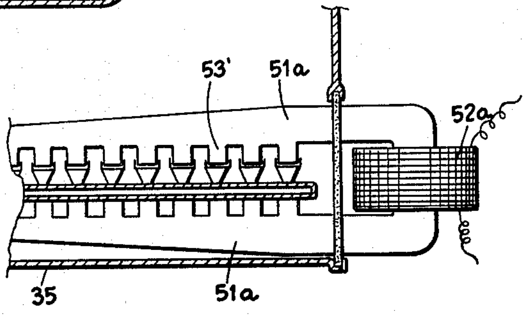

The device, according to the invention, may have other forms. For instance (see FIG. 6) it may be provided that only the shoes 51*a* of the magnet are located in the interior of the casing 35 of the instrument, while the bight portion of the magnet 52*a* with the coil is located on the outside of the same case. It may also be provided— according to the invention—that instead of an electromagnet, a high coercive strength permanent magnet is used, said magnet being of the type with an "energization controlled" by means of a lever or button. A magnet of this type is known in trade under the name of "Eclipse" and is indicated to be fixed onto machine beds, reference planes and the like, measuring instruments, indicators, or the like.

The energization, in the case of electromagnets, is given by direct current, either supplied by a battery in possession of the operator and appropriately inserted therein, or obtained through the rectifying of alternating current. Also, means may be provided to remove the residual magnetization by means of a countercurrent. Alternating current may also be used with particular arrangements for the recording. In this case, if a "dots" recording is required, as the type of that shown in FIG. 3, the "dot," for obvious reasons, should have a certain extension as a certain number of alternations should be impressed on this extension. For this purpose, the bottom 38*a* (see FIG. 4) of the casing which serves as a reference for the recordings, may effect a small displacement parallelly thereto, and this displacement may be controlled through a simple kinematic set (not indicated for simplicity in the figure) by a third cam integrally connected to the two existing ones 55, 23. In order to improve the efficiency of the dotting in the arrangements, as in particular in FIG. 3, the same arrangement may be valuable also in the case of permanent magnets and direct current coils. In a simplified embodiment, and as a variation of FIG. 1, the card may be introduced into the envelopes 37 after the magnets 33 have been positioned. In this case, the card moves with respect to the magnets during the formation of the impression to produce doubly impressed elongated zones, one impression during the introduction of the card and the other impression during the withdrawal of the card. The magnetic image thus occurs as in FIG. 2, but is inverted.

Simpler means may be provided in order to keep the feelers system always active. In this case, the magnets are always located in the "marking" position, and all the manual controls are eliminated. To effect a trip phase shift in the meter, this phase shift may be made completely automatic, unless one resorts to a manual phase shift control.

Still according to the invention, it is possible that, always as a function of the rotation of the counting train device members (and thus of the consumption data), the impressions on the card may be made as a variation of the magnetization strength, in which case this fact may either be associated with an additional character to the signal dimensions induced in the card, or may form a separate unit, in which case the signals, for instance lines, may all have the same length but be impressed with a different strength. The data may be deduced from this strength.

In the case of the electromagnet being energized by direct current (either with the inner or outer coil) a reverse flow current may be provided to cancel the residual magnetization. This reverse current may be obtained directly by an automatic control by the same cam which determines the prompt energization of the electromagnet, without affecting the magnetization of the card.

What I claim is:

1. A metering and data recording device, comprising a closed case, an envelope on the exterior of the case for receiving a magnetically sensitive card to be impressed with said data, said envelope including a non-magnetic wall portion of the case, a plurality of rotatable interoperating members mounted in the case and movable to different angular positions representative of data to be recorded, feeler means operatively associated with said members and selectively movable into and out of engagement with said members, actuating means for said feeler means, said feeler means being responsive to move according to the angular positions assumed by said members when in engagement with said feeler means, and magnetic recording members actuated by said feeler means and supported for movement wholly within the case adjacent to said non-magnetic wall portion to magnetize selected zones of said card when inserted in said envelope adjacent to and outside of said non-magnetic wall portion.

2. A metering and data recording device, comprising a closed case, an envelope on the exterior of the case for receiving a magnetically sensitive card to be impressed with said data, said envelope including a non-magnetic wall portion of the case, a plurality of rotatable interoperating members mounted in the case and movable to different angular positions representative of data to be recorded, feeler means operatively associated with said members and selectively movable into and out of engagement with said members, actuating means for said feeler means, said feeler means being responsive to move according to the angular positions assumed by said members when in engagement with said feeler means, and magnetic recording members actuated by said feeler means and supported for movement wholly within the case adjacent to said non-magnetic wall portion to magnetize selected zones of said card when inserted in said envelope adjacent to and outside of said non-magnetic wall portion, there being geared sectors integral with said feeler means, and rack means meshing with said geared sectors and slidably guided parallel to said non-magnetic wall, said magnetic recording members being carried by said rack means.

3. A metering and data recording device, comprising a closed case, an envelope on the exterior of the case for receiving a magnetically sensitive card to be impressed with said data, said envelope including a non-magnetic wall portion of the case, a plurality of rotatable interoperating members mounted in the case and movable to different angular positions representative of data to be recorded, feeler means operatively associated with said members and selectively movable into and out of engagement with said members, actuating means for said feeler means, said feeler means being responsive to move according to the angular positions assumed by said members when in engagement with said feeler means, and magnetic recording members actuated by said feeler means and supported for movement wholly within the case adjacent to said non-magnetic wall portion to magnetize selected zones of said card when inserted in said envelope adjacent to and outside of said non-magnetic wall portion, there being geared sectors integral with said feeler means, rack means meshing with said geared sectors, and movable supports slidably guiding said rack means, said rack means rolling on the geared sectors toward and away from said non-magnetic wall portion, said magnetic recording members being carried by said rack means to record magnetically on said card when the rack means approach said non-magnetic wall portion inside the case.

4. A metering and data recording device, comprising a closed case, an envelope on the exterior of the case for receiving a magnetically sensitive card to be impressed with said data, said envelope including two closely spaced non-magnetic wall portions, a plurality of rotatable interoperating members mounted in the case and movable to different angular positions representative of data to be recorded, feeler means operatively associated with said members and selectively movable into and out of engagement with said members, actuating means for said feeler means, said feeler means being responsive to move according to the angular positions assumed by said members when in engagement with the feeler means, a generally U-shaped magnetic core, said core having two arms respectively flanking the two non-magnetic wall portions and disposed in the case, said arms having spaced projections extending toward the respective non-magnetic wall portions, and recording members made of magnetic material actuated by said feeler means and movable along said projections at said non-magnetic wall portions to magnetize selected zones of said card when inserted in said envelope between said non-magnetic wall portions, there being then a magnetic flux field extending between said two arms, recording members, non-magnetic wall portions, and the magnetically sensitive card disposed therebetween.

5. A meter and data recording device according to claim 4, wherein said case includes another non-magnetic wall portion, said core having a bight disposed outside said other non-magnetic wall portion and extending therethrough into the case, a coil for magnetizing said core disposed on said bight outside the case, and means for energizing said coil.

References Cited in the file of this patent

UNITED STATES PATENTS

| | | |
|---|---|---|
| 1,455,530 | Hoffman | May 15, 1923 |
| 2,138,287 | Willers | Nov. 29, 1938 |
| 2,319,343 | Poillevey | May 18, 1943 |
| 2,491,110 | Hunt | Dec. 13, 1949 |
| 2,554,323 | Cade | May 22, 1951 |
| 2,743,988 | Allyn | May 1, 1956 |
| 2,757,062 | Hood | July 31, 1956 |
| 2,844,434 | Beard | July 22, 1958 |